United States Patent [19]

Kozyrski et al.

[11] Patent Number: 4,674,669
[45] Date of Patent: Jun. 23, 1987

[54] FRAMING TOOL

[75] Inventors: Vincent T. Kozyrski, Plainville; D. Wayne Hawk, Glastonbury, both of Conn.

[73] Assignee: The Fletcher-Terry Company, Farmington, Conn.

[21] Appl. No.: 795,230

[22] Filed: Nov. 5, 1985

[51] Int. Cl.[4] .......................... B25C 1/02; B26F 3/00
[52] U.S. Cl. ........................ 227/147; 7/142; 81/44; 81/356; 225/104
[58] Field of Search .................. 227/147, 113; 7/132, 7/142; 81/44, 341, 355, 356, 362, 386, 389, 126; 225/104, 106

[56] References Cited

U.S. PATENT DOCUMENTS

| | | | |
|---|---|---|---|
| 256,960 | 4/1882 | Blake | 225/103 |
| 314,572 | 3/1885 | Forshey et al. | 81/356 |
| 347,580 | 8/1886 | Dean . | |
| 441,199 | 11/1890 | Shambarger | 81/356 |
| 861,724 | 7/1907 | Hillix | 225/104 |
| 956,128 | 4/1910 | Mimmack | 81/386 |
| 961,673 | 6/1910 | Basken | 81/356 |
| 1,155,948 | 10/1915 | Millsap | 81/356 |
| 1,332,140 | 2/1920 | Norgord | 81/356 |
| 1,470,026 | 10/1923 | Owen | 81/356 |
| 1,758,664 | 5/1930 | Hoelper | 81/356 |
| 1,781,940 | 11/1930 | Anderson | 81/356 |
| 2,212,599 | 8/1940 | Hall | 225/104 |
| 2,369,346 | 6/1943 | Gearhart | 81/356 |
| 2,528,128 | 10/1950 | Forster | 7/142 |
| 2,605,663 | 1/1948 | Aden | 81/356 |
| 2,716,912 | 12/1952 | Maitland . | |
| 3,370,490 | 8/1966 | Feldman et al. . | |
| 3,736,606 | 6/1973 | Raum et al. | 7/14.1 R |
| 4,026,262 | 5/1977 | Yasuga | 225/96.5 X |
| 4,027,814 | 6/1977 | Gloge et al. | 225/104 |
| 4,095,341 | 6/1978 | Crain | 30/287 |
| 4,118,862 | 10/1978 | Hensel | 30/124 |
| 4,225,072 | 9/1980 | Reeves | 225/104 |
| 4,444,174 | 4/1984 | Hepworth et al. | 125/23 T |

FOREIGN PATENT DOCUMENTS 450845 4/1913 France .

OTHER PUBLICATIONS

Company literature of the Brookstone Company of Peterborough, New Hampshire (two pages).
Cover page and p. 12 of catalogue of The Fletcher-Terry Company.

Primary Examiner—Howard N. Goldberg
Assistant Examiner—Taylor J. Ross

[57] ABSTRACT

A framer's tool consists of a handle member on which is provided an anvil portion for abutment with the outside surface of a picture frame. An actuating rod extends forwardly from the handle member, and is attached to an operating trigger pivotably mounted therewithin. A driving jaw adjustably mounted on the forward portion of the actuating rod, and has a magnetic component on its lower end for setting framer's points, brads and the like, positioning them with a rearward orientation to be squeezed by the tool into the inner surface of the frame component. The anvil portion on the handle member may have a pair of spaced resilient pads mounted upon it, which cooperate with a rib on the confronting surface of the jaw to bend, and thereby fracture, a prescored piece of glass squeezed therebetween. In addition, the tool may be provided with a blade mounted with its cutting edge protruding into a lower corner recess formed into one side of the handle member; this enables use of the tool for trimming a paper backing applied during the framing procedure. The tool may be packaged by mounting it upon a card, with a portion of the handle member extending beyond its margins to permit testing of the tool without disassembling it from the backing card.

15 Claims, 10 Drawing Figures

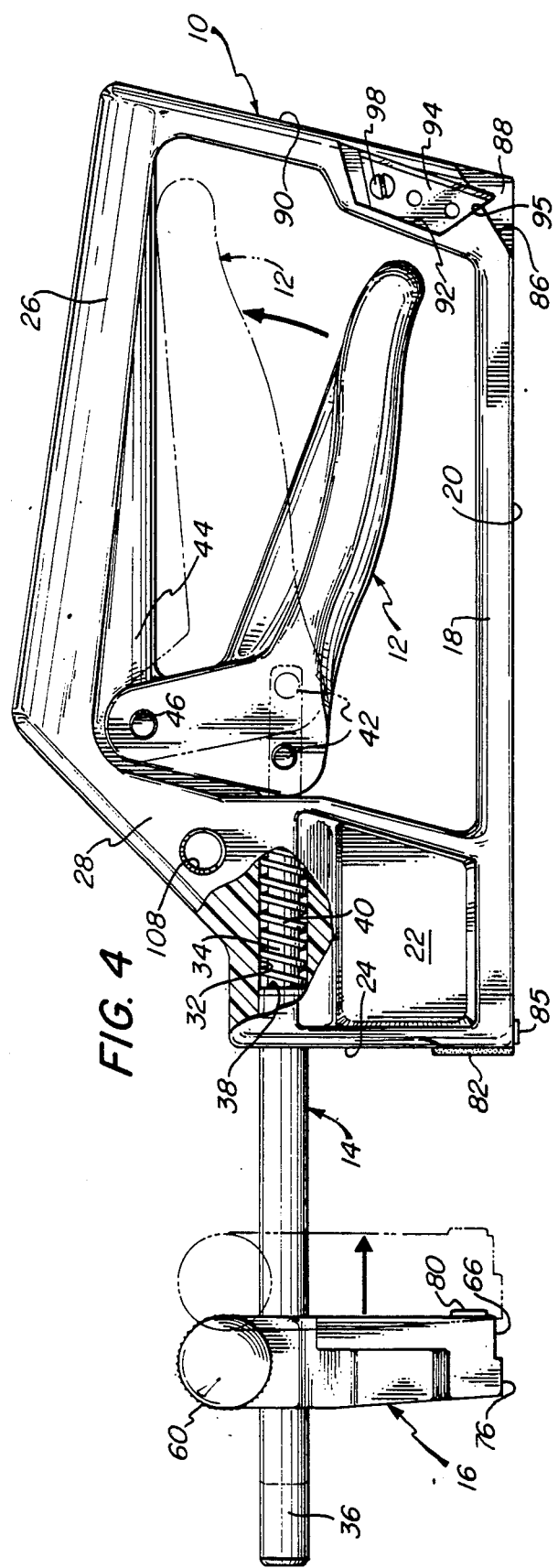
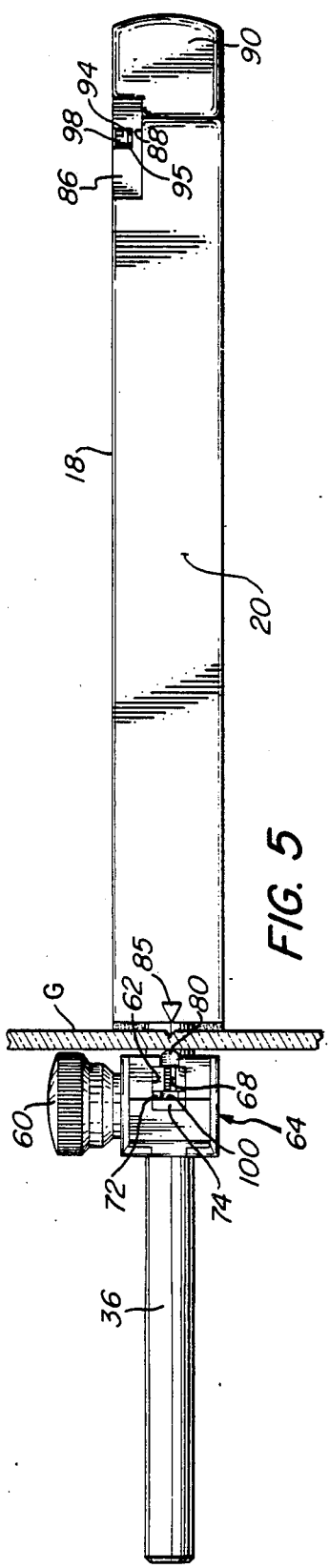
FIG. 4
FIG. 5

FRAMING TOOL

BACKGROUND OF THE INVENTION

A framer's tool which is commonly known as a "brad squeezer" has been commercially available for many years. For example, one company offers a tool of that kind which consists of a pair of pivotable handles, one of which has a sleeve affixed to it and to the other of which is connected a shaft, the latter being slidably received within the sleeve. A first jaw of the tool is rigidly attached to the outer end of the shaft, and a second, padded jaw is adjustably mounted upon the sleeve in confronting relationship to the first. In use, the device is positioned over the frame, with the head of the brad to be driven lying against the end of the movable jaw and with the fixed jaw disposed against the outside edge of the molding. Squeezing the handles drives the brad into the frame.

The patent art also describes such tools. For example, a ratchet-operated device of that nature is shown in the early French Patent No. 450,845, to Stummvoll.

Although the tools of the prior are generally satisfactory for their intended purpose, they do lack certain features that would be advantageous in such an implement. Thus, they would appear to offer minimal levels of stability and control upon fastener orientation, as far as is known the earlier brad squeezers served only a single function, and they would seem less comfortable and convenient to use than desirable.

Lever operated tools having jaw pieces that move toward one another are of course old in the patent art, typical of which are the implements disclosed in the following U.S. Pat. Nos.: 314,572 to Forshey et al, 347,580 to Dean, 441,199 to Shambarger, 961,673 to Basken, 1,155,948 to Millsap, 1,332,140 to Norgord, 1,470,026 to Owen, 1,758,664 to Hoelper, 1,781,940 to Anderson, 2,369,346 to Gearhart, 2,605,663 to Aden, 2,716,912 to Maitland, and 3,370,490 to Feldman et al, the last-mentioned patent teaching a wrench having, on one or both of its jaws, a magnet to facilitate adjustment, to accommodate the work, and to increase the gripping action. In Raum et al U.S. Pat. No. 3,736,606, a tool for untwisting and stripping a pair of intertwined wires is disclosed, wherein an insulation-stripping blade is mounted upon a spring-biased slide.

Tools for breaking different materials, which utilize offset counteracting elements, are of course also known in various forms in the art, and are disclosed for example in the following U.S. Pat. Nos.: 256,960 to Blake, 861,724 to Hillix, 2,212,599 to Hall, 4,026,262 to Yasuga, 4,027,814 to Gloge et al, 4,118,862 to Hensel, 4,225,072 to Reeves, and 4,444,174 to Hepworth et al. The patents to Hall and Reeves are concerned specifically with the provision of devices for fracturing prescored sheet glass, the former disclosing a pliers-like hand tool in which the breaking elements are disposed on the confronting portions of the jaw components. Cut-running and break-out pliers are commercially available, as well, and high-quality tools of this type are sold by The Fletcher-Terry Company, of Farmington, Conn.

Despite the prior art activity indicated by the foregoing, a need remains for a framer's tool which is capable of driving various types of fasteners with a high degree of reliability, and with good control over the direction of insertion into the frame component. There is also a demand for a tool of such a nature which offers the convenience of multiple functions for the framer.

Accordingly, it is an object of the present invention to provide a novel framer's tool which is capable of driving each of a variety of different fasteners into the molding of a picture frame or the like, which tool offers a high degree of reliability in operation, and permits facile setting of the fastener to control the direction of insertion.

It is also an object of the invention to provide a novel tool which is adapted to perform multiple functions involved in framing procedures.

Another object of the invention is to provide such a tool which is strong and durable, comfortable and convenient to use, and designed for stable positioning upon a support surface.

Further objects of the invention are to provide a novel tool having the foregoing features and advantages, which is comprised of relatively few parts and is relatively facile, uncomplicated and inexpensive to manufacture.

SUMMARY OF THE INVENTION

It has now been found that certain of the foregoing and related objects of the invention are attained by the provision of a framer's tool including a handle member having an anvil portion thereon adapted to abut the edge of a picture frame or the like, a jaw piece having means thereon for engaging a fastener to be driven into the frame component, and means for reciprocally mounting the jaw piece on the handle member in confronting, substantially aligned relationship with the anvil portion. The anvil portion and jaw piece have means thereon for cooperatively producing a bending moment in a planar object squeezed between them, and actuating means is provided for reciprocating the mounting means to effect relative movement of the jaw piece and handle member toward one another. As a result, the tool can be used both to drive a fastener into a frame component disposed between the jaw piece and handle member, and also to effect the fracture of scored glass by use of the bending means.

Preferably, the bending means will comprise a pair of resilient pads disposed in laterally spaced relationship on the anvil portion of the handle member, and a cooperating rigid element projecting from the jaw piece toward the pads and substantially aligned with the space therebetween. The opposing inner edges of the resilient pads will usually be generally rectilinear and parallel to one another, and the rigid element will normally be a rectilinear rib projecting from the surface of the jaw piece.

The handle member will desirably include a bottom piece with a substantially planar lower surface, and a front piece extending upwardly from one end of the bottom piece and having the anvil portion thereon adjacent the juncture with the bottom piece. Generally, the mounting means for the jaw piece will be a shaft, and will include a portion projecting forwardly of the front piece at a location above the juncture, from which the jaw piece extends downwardly in general alignment with the front piece. The jaw piece will normally have means thereon for selectively affixing it at a multiplicity of positions along the projecting portion of the mounting means, to enable adjustment of the distance between it and the handle member, and will have the rigid element of the bending means disposed adjacent its lower end.

In preferred embodiments the engaging means will comprise a magnetic component disposed at the lower end of the jaw piece, having a surface exposed thereon and positioned at a level slightly above the plane of the lower surface of the handle member bottom piece. Most desirably, the magnetic component will have a generally planar lower surface portion, with a groove extending inwardly from one edge thereof facing the handle member and with a ledge element projecting downwardly beyond the lower surface portion from adjacent the inner end of the groove. The lower surface portion thereof will be adapted to support a framer's point in face-to-face contact, and the groove will be dimensioned and configured to seat a brad or similar fastener therein. The ledge element will be disposed and adapted to drivingly engage an edge of a framer's point and the head of a brad so supported and seated, respectively, upon operation of the actuating means to move the jaw piece and handle member toward one another. Generally, the projecting distance of the ledge element beyond the lower surface portion of the magnetic component will correspond substantially to the thickness of a conventional framer's point, and a transverse channel may be formed between the lower surface portion and the ledge element to accommodate the head of a brad seated within the groove.

In other preferred embodiments, the handle member of the tool will be recessed on at least one side at the juncture between its bottom and back pieces, to provide an indented corner formation defined by an oblique surface extending between the lower surface of the bottom piece and the rearward surface of the back piece, and by a lateral surface extending from along the oblique surface to the lower and rearward surfaces. The blade mounting structure thereof will be adapted to affix a blade with its cutting edge extending into the side recess beyond the oblique surface and along the lateral surface, but spaced outwardly therefrom. Thus, the handle member can be tipped rearwardly, from a normal orientation for driving fasteners, to a position with both the oblique and lateral surfaces defining the corner formation in contact with a frame component, in which position the tool can be run along the frame to cause the mounted blade to cut material therefrom.

All of the pieces of the handle member will desirably be joined to one another to provide an open frame-like configuration. The actuating member will usually comprise a lever that is pivotably mounted upon a forward portion of the handle member and extends rearwardly therefrom, beneath the top piece and within handle opening, for facile squeezing manipulation from a normal gripping position. The actuating shaft will generally be pivotably connected at its inner end to the lever, with means being provided for biasing it to an outwardly extended position.

Additional objects of the invention are attained by the provision of a tool package assembly comprising, in combination, a tool having a handle member and a shaft portion reciprocably mounted therein and extending therefrom, a backing card having an element thereon slidably engaging the shaft portion of the tool, and means affixing the handle member to the card at a location spaced from the shaft-engaging element. The tool will thereby be securely affixed to the card, with its shaft portion free to move relative to it.

Preferably, the handle member of the tool will have means thereon operatively connected for actuation of the shaft portion, and will extend beyond the card for facile manipulation of the actuation means, with the tool affixed to the card. Most desirably in such an assembly, the engaging element will comprise an integral tab folded from the plane of the card, with an aperture therein through which the shaft portion extends, and the handle member will have a passageway extending laterally through it. The card employed therewith will be provided with an aperture aligned with the passageway of the handle member, and the affixing means will comprise a fastener extending through the card aperture and into the handle member passageway, to effect interengagement therebetween.

BRIEF DESCRIPTION OF THE DRAWINGS

FIG. 4 is a side elevational view of the tool, showing the extended and retracted positions of the driving jaw and actuating trigger in full and phantom line, respectively, and having a section of the head portion broken away to show internal features;

FIG. 5 is a bottom view of the tool with a section of a prescored sheet of glass positioned therein preliminary to breakout;

DETAILED DESCRIPTION OF THE ILLUSTRATED EMBODIMENTS

Figure 1:
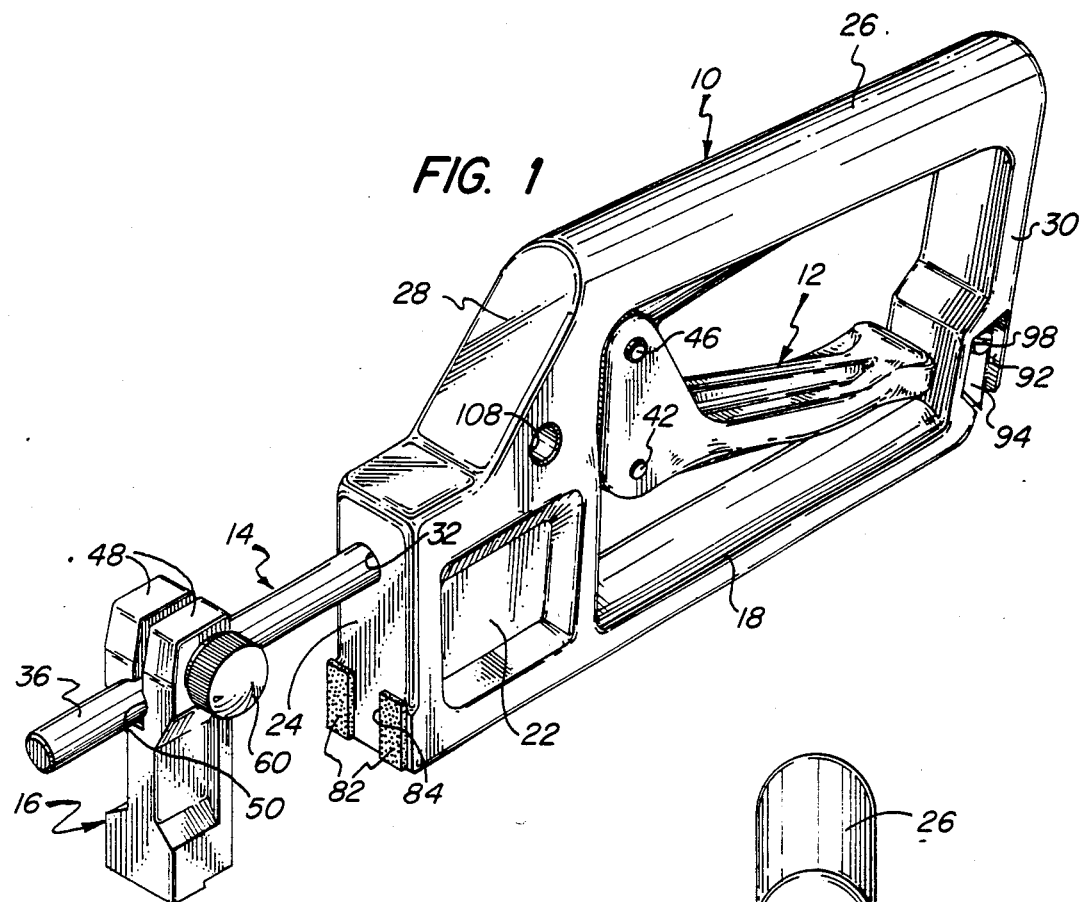
FIG. 1 is a perspective view of a tool embodying the present invention.
Figure 2:
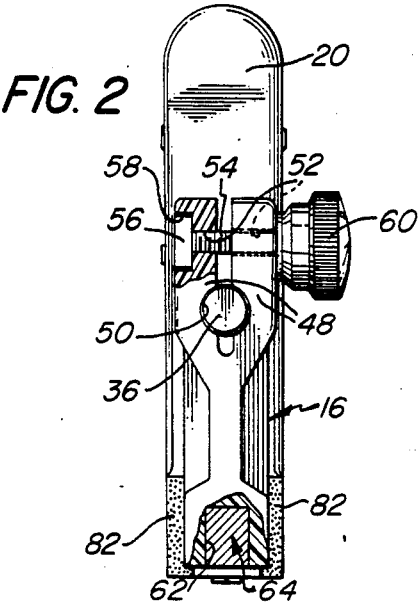
FIG. 2 is a front end view thereof, with a portion of the driving jaw broken away to show internal features thereof.
Figure 3:
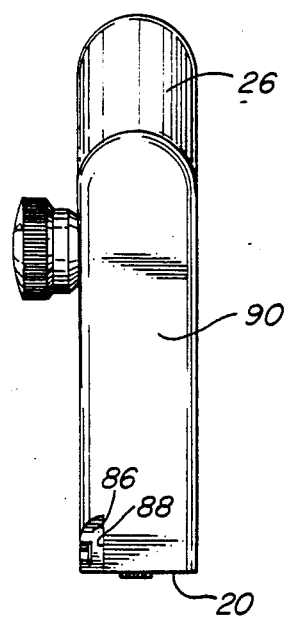
FIG. 3 is a back end view thereof.

Turning now in detail to FIGS. 1-8 of the appended drawings, therein illustrated is a framer's tool embodying the present invention and consisting of a handle member, generally designated by the numeral 10, an actuating trigger, generally designated by the numeral 12, an actuating rod, generally designated by the numeral 14, and a driving jaw, generally designated by the numeral 16. The handle member 10 consists of a rectilinear bottom piece 18 having a generally planar lower surface 20, from the forward end of which extends a head portion 22 with a generally planar forward face or edge surface 24 disposed at a right-angle to the lower surface 20. A top piece 26 is aligned over the bottom piece 18 and is connected to the head portion 22 through an oblique piece 28, and a back piece 30 extends downwardly from the top piece 26 and connects to the bottom piece 18 at their respective rearward ends. Thus, the pieces 18, 26, 28 and 30 cooperate with the head portion 22 to define an open, generally frame-like handle structure.

A longitudinally extending bore 32 is formed through the upper part of the head portion 22 midway between the sides of the handle member 10, and serves to slideably support the actuating rod 14. The latter has an inner end portion 34 which is of reduced diameter relative to the outer end portion 36, providing a circumferential shoulder 38 therebetween upon which bears one end of a coil spring 40. The opposite end of the spring 40 bears upon an abutment surface (not shown) formed within the head portion 22, causing it to bias the rod 14 toward an extended position forwardly of the handle member 10. The innermost end of the rod 14 is pivotably attached to the actuating trigger 12 by a pin 42 which extends transversely through both parts, and the trigger 12 is in turn pivotably mounted upon a flange portion 44 of the handle member by a second transverse pin 46. Thus, the trigger 12 can be squeezed toward the top piece 26 to retract the rod 14 against the outward force of the spring 40, as is readily apparent.

The driving jaw 16 is of bifurcated construction at its upper end to provide a pair of laterally spaced legs 48, each having a semicircular recess 50 extending longitudinally along its inner surface, the recesses 50 cooperatively defining a passageway of generally circular cross section between the legs 48 in which the outer end portion 36 of the rod 14 is received. Aligned holes 52 extend transversely through the legs 48, and receive the threaded shaft 54 of a thumb screw; the shaft 54 is engaged by a square nut 56 which is, in turn, seated within the mating recess 58 formed into the outer surface of one of the legs 48, to permit facile tightening and loosening of the jaw 16 by turning the knurled knob 60 of the thumb screw, in conventional fashion. The jaw 16 is thus adjustably mounted upon the rod 14 for fixed engagement thereon at any point along its outer end portion 36.

Figure 6:
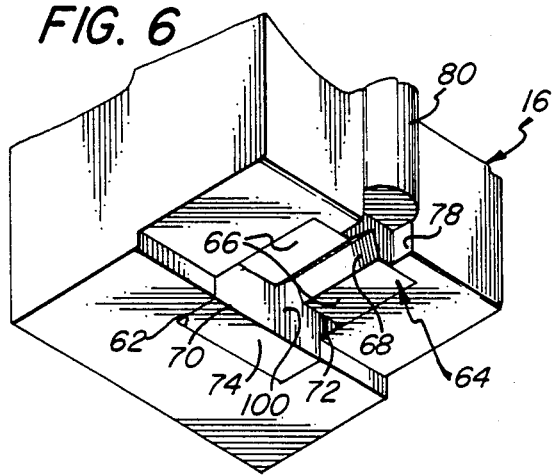
FIG. 6 is a fragmentary perspective view showing the lower end of the driving jaw of the tool of the foregoing FIGS., drawn to a scale greatly enlarged therefrom.
Figure 7:
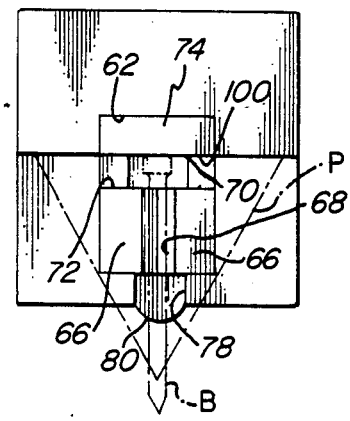
FIG. 7 is a bottom view of the jaw, drawn to a scale somewhat reduced from that of FIG. 6 and showing in phantom line both a framer's point and also a brad positioned for driving thereon.

The lower end portion of the driving jaw 16 has formed into it an upwardly extending cavity 62 of generally rectangular cross-sectional configuration, into which a magnetic component, generally designated by the numeral 64 and typically of sintered metal construction, is inserted and retained (such as by extending the surrounding portions of the body slightly thereover). The magnetic component itself is best seen in FIGS. 5-7, and is in the form of a block having coplanar flat rectangular surface elements 66 exposed on the bottom of the jaw 16, with a V-shaped groove 68 extending longitudinally therebetween. At the back of the exposed portion is formed a ledge element 70, which projects slightly beyond the plane of the surface elements 66 and is spaced therefrom by a transverse channel 72. The ledge element 70 also has a flat outer surface 74; the distance between the planes of the surfaces 66 and 74 is substantially that of the thickness of a conventional framer's point (such a point being shown in phantom line and designated "P" in FIG. 7), and the surface 74 is flush with the coplanar surface element 76 on the bottom of the jaw 16. The opposite side of the jaw body is upwardly notched at 78, to provide access to the groove 68 of the magnetic component 64, and a rib element 80 of arcuate cross section extends upwardly therefrom on the longitudinal centerline of the jaw.

A pair of rectangular pads 82 (which may for example be made of a resilient rubbery material) are disposed on the forward face 24 of the handle member head portion 22. The space 84 between them extends along the medial plane of the handle member 10, and is aligned with the apex of the rib 80 formed on the confronting surface of the driving jaw 16; its position is indicated by the small triangular boss 85 provided on the lower surface 20 of the bottom handle piece 18.

At its opposite end, the corner of the handle member (at the juncture between the bottom piece 18 and the back piece 30) is relieved on one side by an indentation, which is defined by oblique and lateral surfaces 86, 88, respectively, the lateral surface 88 extending from the oblique surface to the surfaces 20, 90 of the bottom piece 18 and the back piece 30. A generally trapezoidal recess 92 is formed into the surface of the back piece 30 adjacent the corner indentation, which serves to receive a similarly dimensioned and configured blade 94, positioned therein with its tip protruding through the connecting aperture 95 to extend beyond the oblique surface 86 and into the indentation along (but spaced outwardly from) the lateral surface 88. By removal of the screw 98 the blade 94 can be shifted upwardly from the aperture 95, thereby causing it to be substantially completely enclosed within the recess 92 for protection against damage and as a safety feature; even in the outward blade position, however, the unrelieved corner portion of the handle member will afford substantial protection.

Figure 8:
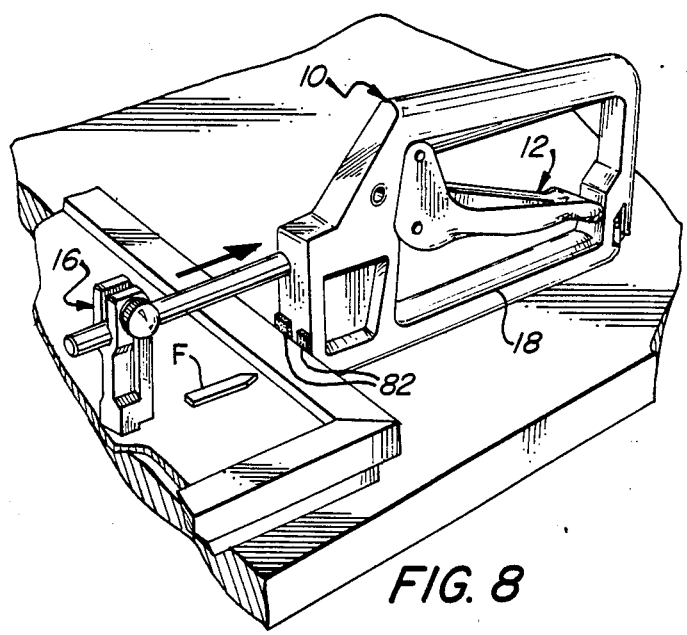
FIG. 8 is a representation of the tool of the invention in use to drive a fastener into a picture frame.

As is indicated by FIG. 8, the tool is used for driving fasteners (normally with both the frame and the tool resting on a table) simply by abutting the cushioning pads 82 against the outside surface of the frame with the lower end of the driving jaw 16 therewithin, the lower end of the jaw being spaced above the surface 20 of the handle member 10 a distance sufficient to provide appropriate clearance. If a flat, relatively wide fastener (such as the elongated, pointed element F of FIG. 8, or the framer's point P of FIG. 7) is to be used, it will be positioned flush against the surface elements 66 of the magnetic component 64, with a straight trailing edge abutted against the forward face 100 of the ledge element 70. If a brad such as B is to be employed instead, it will be seated within the V-shaped channel 68 with its head resting upon the surface 100 of the ledge element. In each instance however the fastener (normally made of a ferrous metal) is held in place by magnetic force, and is set a proper orientation for driving; the fastener may conveniently be picked up by the magnet and repositioned thereon (if necessary) by light finger pressure, and a series of north and south poles are desirably provided along the length of the component to afford optimal magnetic characteristics. Squeezing the trigger 12 will of course draw the jaw 16 toward the head portion 22 of the handle member (as suggested by the full and phantom line positions shown in FIG. 4), in turn driving the fastener into the inside surface of the frame component.

The tool is also used for breaking-out sheets of glass by completing a fissure previously scribed thereupon in any conventional fashion. As is indicated in FIG. 5, this is done simply by inserting the edge of the glass sheet G between the confronting surfaces of the jaw 16 and head portion 22 (the jaw having been affixed on the shaft 14 in position to bring those parts into sufficiently close proximity with its surfaces), with the scored surface resting upon the pads 82 and with the rib 80 disposed to act against the opposite surface. The rib 80 should of course be aligned with the score line and in registry with the space 84 between the pads 82, as will be facilitated by use of the triangular boss 85; squeezing of the actuating trigger 12 will produce a bending moment in the glass to effect the desired breaking action.

In addition to the applications of the tool already described, the blade 94 at the back can be used to trim paper or other backing material from the final frame assembly. This is accomplished by tipping the handle member rearwardly (e.g., with the front of the tool rotated in a clockwise direction from the orientation of FIG. 4) to bring the oblique and lateral surface elements 86, 88 of the corner indentation into simultaneous contact with the rear and side surfaces of the frame component. Running the tool along the edge (with the blade 94 extended of course to its operative position) will produce a neat straight cut in the backing material, at a uniform spacing from the edge.

Figure 10:
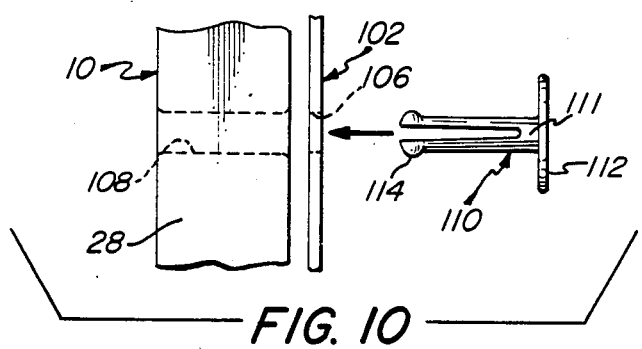
FIG. 10 is an exploded fragmentary edge view of an intermediate section of the assembly of FIG. 9, drawn to a scale enlarged therefrom.
Figure 9:
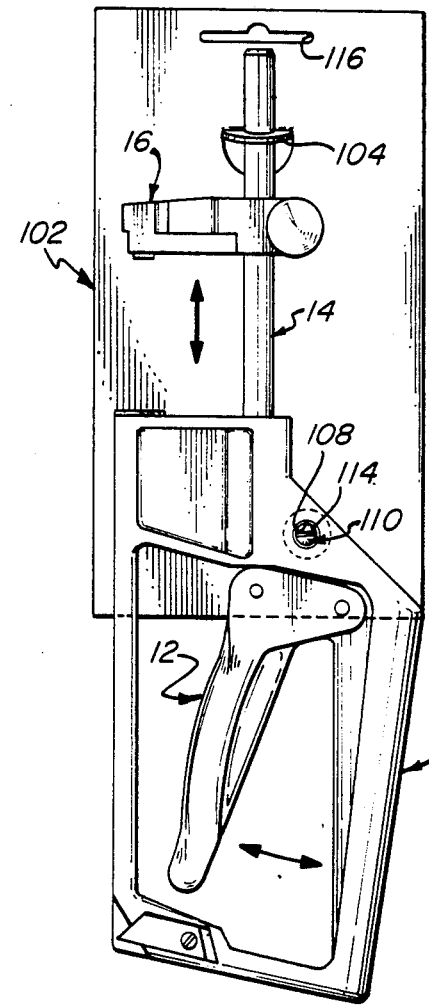
FIG. 9 is a plan view of a package assembly embodying the invention.

Turning finally to FIGS. 9 and 10, a convenient means for packaging the tool of the invention is illustrated, and consists of a backing card, generally designated by the numeral 102, against which the tool is positioned. The card 102 has an upstanding ear or tab 104 integrally formed thereon, in which is provided an aperture (unnumbered, and just barely visible in FIG. 9); a second aperture 106 is formed through the body of the card at a location spaced from the ear 104. The handle member 10 has a bore 108 extending transversely through it near the juncture of the oblique piece 28 and the head portion 22, which is aligned over the aperture 106 of the backing card 102. A plug, generally designated by the numeral 110 (which may advantageously be made of plastic material such as nylon), is inserted through the aperture 106 and the aligned bore 108; it has a split shaft portion 111 to afford resiliency, and an enlarged head 112 and tip 114 at its opposite ends. The head 112 bears of course upon the rear surface of the card, and the tip frictionally engages within the bore 108 of the handle member to thereby secure the tool in assembly against the card. A notched slot 116 is cut through the top of the card to permit the package to be suspended from a display rack, in typical fashion.

It will be noted that the tool is so positioned on the card that the major portion of the handle member 10 extends beyond the corresponding edge. This is desirable to afford the prospective purchaser an opportunity to test the device while it remains in packaged condition, and it will be appreciated that the shaft 14 will readily slide within the aperture of the ear 104 to enable such operation. It will also be appreciated that the bore 108 through the handle member will serve as a convenient means by which the tool can be hung for storage purposes.

Variations in construction can of course be made without departing from the novel concepts of the invention, as will be evident to those skilled in the art. Thus, although the shaft of the actuating mechanism will normally be a round rod, as illustrated, a shaft of non-circular cross section could be substituted if so desired; for example, it could be in the form of a regular polygon to permit positive positioning of the jaw piece relative to the handle member at predetermined angular orientations (with the passage through the jaw of course being conformed thereto). Moreover, the surface of the shaft may be roughened, such as with diamond knurling, to increase the level of frictional engagement with the jaw piece, as may be particularly desirable from the standpoint of adapting the tool for use with hardwood framing. The nature of the fastener engaging means may also deviate (e.g., it may be of a purely mechanical nature) although use of the configured magnet described is highly advantageous. Furthermore, although a blade-receiving recess is shown on only one side of the handle member, the provision of such a feature on the opposite side is advantageous from the standpoint of facilitating cutting with either hand, and will be preferred in many instances. Finally, the several parts of the tool may be made of any suitable materials; however, tough and durable plastics will normally be preferred for the handle components and the jaw body.

Thus, it can be seen that the present invention provides a novel framer's tool which is capable of driving each of a variety of different fasteners into the molding of a picture frame or the like, which tool offers a high degree of reliability in operation, and permits facile setting of the fastener to control the direction of insertion. The tool of the invention is adapted to perform multiple functions involved in framing procedures, and it is strong and durable, comfortable and convenient to use, and may be designed for stable positioning upon a support surface. In addition, the tool is comprised of relatively few parts, and is relatively facile, uncomplicated and inexpensive to manufacture.

Having thus described the invention, what is claimed is:

1. A framer's tool comprised of: a handle member having an anvil portion thereon adapted to abut the edge of a frame for a picture or the like; a jaw piece having means theron for engaging a fastener to be driven into the frame component; means for mounting said jaw piece on said handle member in confronting relationship to said anvil portion, for relative reciprocal movement, with said engaging means and anvil portion substantially aligned; means on said anvil portion and jaw piece for cooperatively producing a bending moment in a planar object squeezed therebetween, said bending moment-producing means comprising a pair of resilient pads disposed in laterally spaced relationship on said anvil portion of said handle member, and a rigid element projecting from said jaw piece toward said pads and substantially aligned with the space therebetween: and actuating means for reciprocating said mounting means to effect relative movement of said jaw piece and handle member toward one another, whereby said tool can be used both to drive a fastener, engaged by said engaging means, into a frame component disposed between said jaw piece and handle member, and also to effect the fracture of scored glass by said bending means.

2. The tool of claim 1 wherein the opposing inner edges of said resilient pads are generally rectilinear and parallel to one another, and wherein said rigid element is a rectilinear rib projecting from the surface of said jaw piece.

3. The tool of claim 1 wherein said handle member includes a bottom piece having a substantially planar lower surface, and a front piece extending upwardly from one end of said bottom piece and having said anvil portion thereon adjacent the juncture with said bottom piece, wherein said mounting means for said jaw piece includes a portion projecting forwardly of said front piece at a location above said juncture, and wherein said jaw piece extends downwardly from said projecting portion of said mounting means in general alignment with said front piece, said rigid element of said bending means being disposed adjacent the lower end of said jaw piece.

4. The tool of claim 1 wherein said jaw piece has means thereon for selectively affixing it at a multiplicity of positions along said projecting portion of said mounting means, to enable adjustment of the distance between said jaw piece and said handle member.

5. The tool of claim 1 wherein said engaging means on said jaw piece comprises a magnetic component.

6. The tool of claim 5 wherein said handle member includes a bottom piece having a substantially planar lower surface and a front piece extending upwardly from one end thereof, said anvil portion being disposed thereon adjacent the juncture with said bottom piece; wherein said jaw piece mounting means includes a portion that projects forwardly of said front piece and is disposed upwardly of said juncture, said jaw piece entending downwardly therefrom; wherein said bending means includes a rigid element projecting from said jaw piece toward said anvil portion of said handle member, at a location adjacent said lower end; and wherein said magnetic component is disposed on the bottom of said lower end, and has a surface exposed on said bottom end of said jaw piece and disposed at a level slightly above the plane of said lower surface of said handle member bottom piece, to provide appropriate clearance for such operation with both the frame and also said handle member resting on a common flat surface.

7. The tool of claim 6 wherein said magnetic component has a generally planar lower surface portion with a groove extending inwardly from one edge thereof facing said handle member, and with a ledge element projecting downwardly beyond said lower surface portion from adjacent the inner end of said groove, said lower surface portion being adapted to support a framer's point in surface contact thereon and said groove being dimensioned and configured to seat a brad or similar fastener therein, and said ledge being disposed and configured to drivingly engage an edge of a framer's point and the head of a brad so supported and seated, respectively, upon operation of said actuating means to move said jaw piece and handle member toward one another.

8. The tool of claim 7 wherein the projecting distance of said ledge element beyond said lower surface portion of said magnetic component corresponds substantially to the thickness of a conventional framer's point, and wherein a transverse channel is formed between said lower surface portion and said ledge.

9. A framer's tool comprised of: a handle member including a generally rectilinear bottom piece with a substantially planar lower surface, a front piece extending upwardly from one end of said bottom piece and having an anvil portion thereon adjacent the juncture with said bottom piece and adapted to abut the edge of a frame for a picture or the like, a top piece overlying said bottom piece and adapted for gripping by the user, a back piece extending upwardly from the opposite end of said bottom piece, and blade mounting structure disposed generally at the juncture therebetween; an actuating member mounted upon said handle member; an actuating shaft connected to said actuating member and mounted by said handle member for axial reciprocating movement, said shaft having a portion projecting forwardly of said front piece; and a jaw piece mounted upon said forward portion of said shaft and having means thereon for selectively affixing it at a multiplicity of positions therealong, said jaw piece having means thereon for engaging a fastener to be driven by said tool, said engaging means being disposed in confronting relationship to said anvil portion and substantially aligned therewith.

10. The tool of claim 9 wherein said handle member is recessed on at least one side at said juncture between said bottom and back pieces to provide an indented corner formation defined by an oblique surface extending between said lower surface of said bottom piece and the rearward surface of said back piece, and by a lateral surface extending from along said oblique surface to said lower and rearward surfaces, and wherein said blade mounting structure is adapted to affix a blade with its cutting edge extending into the side recess beyond said oblique surface and along said lateral surface and spaced outwardly therefrom, whereby said handle member can be tipped rearwardly from a normal orientation for driving fasteners to a position with both said oblique surface and said lateral surface in contact with a frame component, in which position said tool can be run along the frame component to cause the mounted blade to cut material therefrom.

11. A framer's tool comprised of: a handle member including a generally rectilinear bottom piece with a substantially planar lower surface, a front piece extending upwardly from one end of said bottom piece, having an anvil portion thereon adjacent the juncture with said bottom piece and adapted to abut the edge of a frame for a picture or the like, and a top piece overlying said bottom piece and adapted for gripping by the user; an actuating member mounted upon said handle member; an actuating shaft connected to said actuating member and mounted by said handle member for axial reciprocating movement, said shaft having a portion projecting forwardly of said front piece; a jaw piece mounted upon said forward portion of said shaft and having means for selectively affixing it at a multiplicity of positions therealong, said jaw piece having means thereon for engaging a fastener to be driven by said tool, said engaging means being disposed in confronting relationship to said anvil portion and substantially aligned therewith; and means on said anvil portion and jaw piece for cooperatively producing a bending moment in an object squeezed therebetween, said bending means comprising a pair of resilient pads disposed on said anvil portion in laterally spaced relationship, and a rigid element protruding from said jaw piece toward said pads and substantially aligned with the space therebetween.

12. The tool of claim 11 wherein said engaging means comprises a magnetic component and wherein said jaw piece extends downwardly from said actuating shaft to provide a lower end portion spaced above the plane of said lower surface of said handle member bottom piece, said magnetic component being disposed on said lower end portion and having a generally planar lower surface portion thereon which is substantially parallel to said plane of said bottom piece lower surface, said rigid protruding element also being on said lower end portion of said jaw piece and disposed adjacent said magnetic component.

13. The tool of claim 11 wherein all of said pieces of said handle member are joined to one another to provide an open frame-like configuration, and wherein said actuating member comprises a lever pivotably mounted upon a forward portion of said handle member and extending rearwardly therefrom beneath said top piece and within the opening of said handle member, for facile squeezing manipulation from a normal gripping position thereon, said actuating shaft being pivotably connected at its inner end to said lever, and said tool additionally including means biasing said actuating shaft to a position extended outwardly thereof.

14. A framer's tool comprised of: a handle member having an anvil portion thereon adapted to abut the edge of a frame for a picture or the like; a jaw piece having means thereon for engaging a fastener to be driven into the frame component; means for mounting said jaw piece on said handle member in confronting relationship to said anvil portion, for relative reciprocal movement, with said engaging means and anvil portion substantially aligned; and actuating means for reciprocating said mounting means to effect relative movement of said jaw piece and handle member toward one another to enable use of said tool for driving a fastener engaged by said engaging means into a frame component disposed between said jaw piece and handle member, said engaging means comprising a magnetic component dimensioned and configured to engage a fastener in a predetermined orientation for driving upon operation of said actuating means to move said jaw piece and handle member toward one another, said magnetic component having a generally planar lower surface portion exposed on the bottom of said jaw piece, with a groove extending inwardly from one edge thereof facing said handle member and with a ledge element projecting downwardly beyond said lower surface portion from adjacent the inner end of said grove, said lower surface portion of said component being adapted to support a framer's point in surface contact thereon and said groove being dimensioned and configured to seat a brad or similar fastener therein, and said ledge being disposed and configured to drivingly engage an edge of a framer's point and the head of a brad so supported and seated, respectively.

15. The tool of claim 14 wherein the projecting distance of said ledge element beyond said lower surface portion of said magnetic component corresponds substantially to the thickness of a conventional framer's point, and wherein a transverse channel is formed between said lower surface portion and said ledge to accommodate the head of a brad seated within said inwardly extending groove.

* * * * *